United States Patent
Coombs et al.

[11] Patent Number: 5,989,626
[45] Date of Patent: Nov. 23, 1999

[54] MIXED OXIDE HIGH INDEX OPTICAL COATING MATERIAL AND METHOD

[75] Inventors: Paul G. Coombs, Santa Rosa, Calif.; Russell E. DeLong, Bridgeport, W. Va.; Charlotte R. LeGallee, Healdsburg, Calif.

[73] Assignee: Flex Products, Inc., Santa Rosa, Calif.

[21] Appl. No.: 08/881,039

[22] Filed: Jun. 23, 1997

Related U.S. Application Data

[63] Continuation-in-part of application No. 08/438,198, May 9, 1995, Pat. No. 5,641,719.

[51] Int. Cl.⁶ .............................. C04B 35/462; B05D 5/06
[52] U.S. Cl. .................... 427/162; 427/166; 427/250; 427/255; 427/255.3; 427/596; 427/597; 501/103; 501/134; 501/152
[58] Field of Search .................................... 501/134, 103, 501/152; 427/162, 597, 596, 250, 255, 166, 255.3

[56] References Cited

U.S. PATENT DOCUMENTS

| | | |
|---|---|---|
| 2,653,107 | 9/1953 | Blumenthal .............................. 501/103 |
| 3,034,925 | 5/1962 | Kraus et al. . |
| 3,049,432 | 8/1962 | Weber ...................................... 501/103 |
| 3,264,694 | 8/1966 | Weber ...................................... 501/103 |
| 3,948,813 | 4/1976 | Holcombe, Jr. et al. ............... 601/103 |
| 5,021,386 | 6/1991 | Muan et al. ............................ 502/248 |
| 5,049,355 | 9/1991 | Gennari et al. . |
| 5,106,794 | 4/1992 | Oizumi ................................... 501/103 |
| 5,225,382 | 7/1993 | Mizuno et al. ......................... 501/134 |
| 5,340,607 | 8/1994 | Friz et al. ............................... 427/162 |
| 5,641,719 | 6/1997 | Coombs ................................. 501/134 |

FOREIGN PATENT DOCUMENTS

| | | |
|---|---|---|
| 4208811 | 9/1993 | Germany . |
| 009524 | 7/1980 | Japan . |

*Primary Examiner*—Janyce Bell
*Attorney, Agent, or Firm*—Workman, Nydegger & Seeley

[57] ABSTRACT

A composition of material of the formula $MN_xO_y$ where M and N are metals selected from the group of elements consisting of Sc, Y, La, Ce, Pr, Nd, Sm, Eu, Gd, Tb, Dy, Ho, Er, Tm, Yb, Lu, Ti, Zr, Hf, V, Nb, Ta, Ac, Th, and U where O is oxygen and x and y have values such that the oxygen-to-metal ratio is less than 4 and the ratio of $y/(1+x)$ is also less than 4, said material being in the form of a single oxide phase and having a crystal structure of a single type alone with no detectable crystal structure of a second type, said material being sub-stoichiometric.

15 Claims, 1 Drawing Sheet

MIXED OXIDE HIGH INDEX OPTICAL COATING MATERIAL AND METHOD

This application is a continuation-in-part of application Ser. No. 08/438,198 now U.S. Pat. No. 5,641,719.

This invention relates to a mixed oxide high refractive index coating material and method.

U.S. Pat. No. 3,034,924 discloses mixtures of lanthanide and transition metal/metal oxides. Zirconium oxide is a commercially available high index coating material. However, it has a number of disadvantages including high melting temperature, high power requirements and inhomogeneities in coatings made therefrom. At the same time, titanium oxides are also used as high index coating materials. Titanium oxide coatings often possess unwanted absorption. Mixtures of zirconium oxide and titanium oxide powders are also commercially available. The mixtures are multi-phase materials, however, and hence do not yield a congruently evaporating source. There is therefore a need for new and improved mixed oxide high index optical coating materials which overcomes these disadvantages.

In general, it is an object of the present invention to provide a mixed oxide high index coating material which is particularly suitable for use in anti-reflection coatings.

Another object of the invention is to provide a material and method of the above character which can be melted at lower temperatures.

Another object of the invention is to provide a material and method of the above character which lends itself to electron beam evaporation.

Another object of the invention is to provide a material and method of the above character which can be reactively evaporated with oxygen to yield a stoichiometric material.

Another object of the invention is to provide a material and method of the above character which provides hard and adherent films.

Additional objects and features of the invention will appear from the following description in conjunction with the accompanying drawing.

Figure 1:
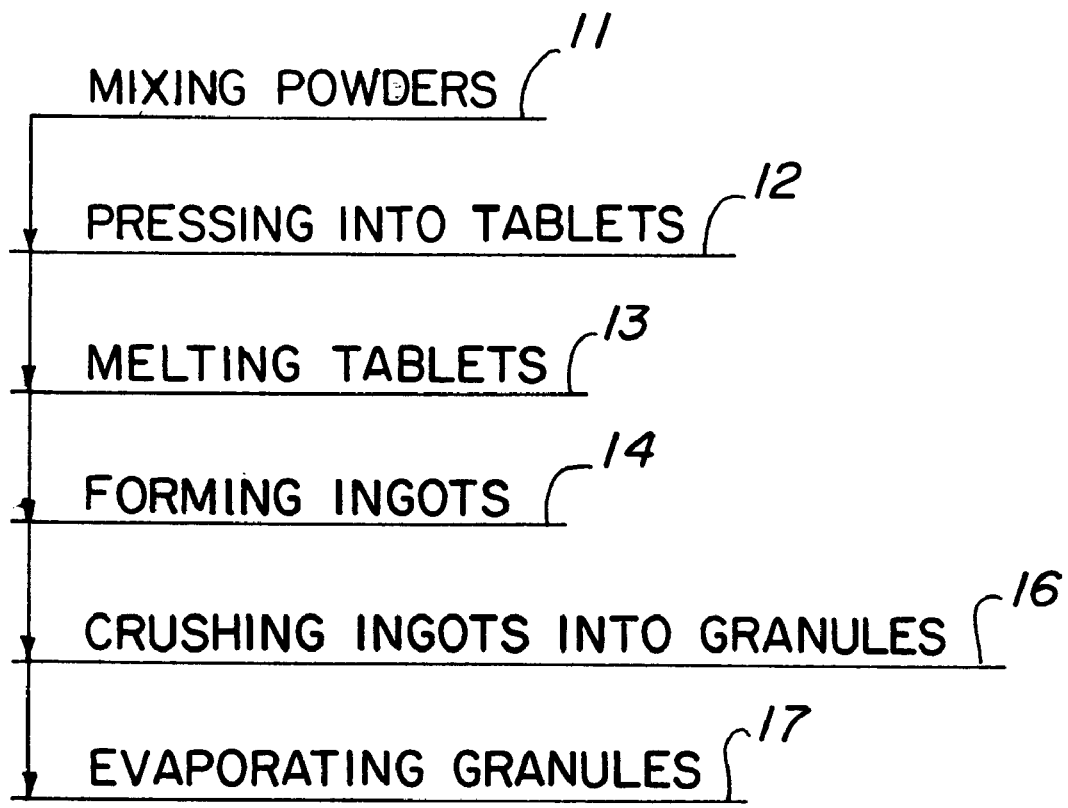
FIG. 1 is a flow chart showing the method of the present invention.

In the general case of the present invention, the composition of the material has the formula $MN_xO_y$, where M and N are metals selected from the group of elements consisting of Sc, Y, La, Ce, Pr, Nd, Sm, Eu, Gd, Tb, Dy, Ho, Er, Tm, Yb, Lu, Ti, Zr, Hf, V, Nb, Ta, Ac, Th, and U and where O is oxygen and x and y are chosen such that the oxygen-to-metal ratio is less than 4 and the ratio of $y/(1+x)$ is also less than 4. The composition of materials which fall into this category include the following examples: $YTi_xO_y$, $HfTi_xO_y$, and $ZrNb_xO_y$. Thus it can be seen that the material is comprised of two metal/metal oxides. However, the composition of the material could just as easily be comprised of three or more metal/metal oxides. In the case where the material is comprised of three metal/metal oxides, the material composition can be written in the form $LM_xN_zO_y$, where L, M and N are metals selected from the group of elements listed above, O is oxygen and x, z and y have values such that the oxygen-to-metal ratio is less than 4 and the ratio $y/(1+x+z)$ is also less than 4.

One specific composition of a material which is within the general case described above is $ZrTi_xO_y$, where x is typically 1.0, and y varies from 2.0 to 3.9. It is also possible to formulate other materials with y values between a value greater than 0 and 2.0. However, these materials would be metallic in nature and would be very difficult to utilize to produce thin films of $ZrTiO_4$ using reactive evaporation. As the value of x increases above 1.0, the mixture becomes more titania-rich and the phase diagram becomes more complicated. This is especially true when the material is sub-stoichiometric. As the value of x drops below 1.0, the material begins to take on properties of pure zirconia and the melting temperature increases, eliminating one of the distinct advantages of the material of the present invention.

In one embodiment of the present invention, a homogeneous mixture was prepared of 15.6% Ti, 17.4% $TiO_2$, and 67.0% $ZrO_2$ by weight. The powdered materials were thoroughly mixed as shown in Step 11 of FIG. 1. As explained above, the weight percentages of the three components were chosen to give the molecular formula $ZrTiO_{2.8}$. However, the proportions of Ti, $TiO_2$, and $ZrO_2$ could have been varied so as to give the molecular formula $ZrTiO_y$ where y could range from 2.0 to 3.9. The powders were then homogenized and tabletized.

After the tablets have been formed as shown in Step 12, the tablets are then melted as shown in Step 13 in a suitable manner, such as by use of an induction or electron beam furnace. During the melting step, the three powdered components are reacted to form a single oxide phase. The melt step can be used to form ingots, as shown in Step 14, of a suitable size such as a diameter of 5 cm and a length of 15–75 cm. The material can then be stored in this form until ready for use. Alternatively, the ingots can be crushed or broken up into granules of a size 0.5–5 mm and preferably about 2 mm as shown by Step 16 in FIG. 1. Also, if desired, the crushed material can be stored in this form until ready to be used.

Let it be assumed that it is desired to utilize the material in forming a layer of an anti-reflection coating such as that described in co-pending application Ser. No. 08/438,197 filed May 9, 1995. In this embodiment the material had a crystal structure of the type cubic zirconia alone with no detectable crystal structure of the type $ZrTiO_4$. The crushed ingots in the form of granules were supplied as a feedstock to an electron gun evaporator of a conventional type to form the high index layer of an anti-reflection coating of the type described in co-pending application Ser. No. 08/438,197 filed May 9, 1995. During the evaporation of the material, an excess of oxygen was introduced into the vacuum chamber of the coating apparatus so that the sub-stoichiometric material was reactively evaporated with the oxygen to yield a stoichiometric coating.

It was found that the crushed ingot material, which is in the form of $ZrTiO_{2.8}$ melted at a temperature of approximately 1800° C., which is approximately 900° lower than the melting point of pure zirconium oxide. This lower melting and deposition temperature is very advantageous because much less heat is radiated from the source onto the substrate. For example, a source radiating at a temperature of 1800° C. emits less than one-fourth the total amount of energy as a 2700° C. source. The lower deposition temperatures of the material of the present invention permits coatings to be applied at higher rates and to thinner polymeric substrate materials, which is a definite advantage for obtaining high production, low cost yields of anti-reflection coatings utilizing roll coaters. In connection with this embodiment of the present invention, it has been found that the addition of the titanium oxide to the mixture results in the much lower melting temperatures as, for example, temperatures at least approximately 900° C. less than the melting temperature without the addition of the titanium oxide.

This material was found to have an index of refraction of approximately 2.0. When combined with a low index material such as described in co-pending application Ser. No. 08/438,197 filed May 9, 1995 it was found that the anti-reflection coatings formed were as hard and as adherent as films made from zirconium oxide as the high index material.

Another material formulated in accordance with the present invention is $NbTi_{0.5}O_3$, which can be generalized to $NbTi_{0.5}O_y$, where y can vary between a value greater than 0 and 3.5. The $NbTi_{0.5}O_3$ material was produced in a similar manner to the $ZrTiO_y$. Tablets were pressed from a homogeneous mixture of $Nb_2O_5$, Ti, and $TiO_2$ powders. These tablets were then melted into an ingot and crushed to provide feedstock for the electron gun evaporator. Although Nb/Ti ratios other than 2.0 can be used, $NbTi_{0.5}O_3$ was selected because it can be reactively evaporated with oxygen to yield the stoichiometric material $NbTi_{0.5}O_{3.5}$ ($Nb_2TiO_7$). This material had an index of refraction of approximately 2.0. Also, when utilized in making an anti-reflection coating, it had the desirable properties of a lower evaporation temperature, for example 1900° C. which is 200° C. below 2100° C. for $Nb_2O_5$.

From the foregoing it can be seen that there has been provided a new and improved class of mixed oxide high index optical coating materials and a method for applying the same which has many desirable features. Particularly, it lends itself to roll-coating operations because of its lower temperature required for evaporation of the material. It lends itself to electron gun evaporation because it is a single phase material and thus avoids fractionation. In addition, it provides a material which can be evaporated by thermal means due to its lower temperature of evaporation. Also it provides a material which is hard and durable which particularly lends itself for use in anti-reflection coatings.

What is claimed is:

1. A composition of material of the formula $MN_xO_y$ where M and N are metals selected from the group Sc, Y, Ce, Pr, Nd, Sm, Eu, Gd, Tb, Dy, Ho, Er, Tm, Yb, Lu, Ti, Zr, Hf, V, Ta, Ac, Th, and U, where O is oxygen and x and y have values such that the oxygen-to-metal ratio is less than 4 and the ratio of y/(1+x) is also less than 4, said material being in the form of a single oxide phase and having a crystal structure of a single type alone without significant crystal structure of a second type, said material being sub-stoichiometric.

2. A material as in claim 1 wherein M is Zr and N is Ti and wherein the material has a crystal structure of the type of cubic zirconia with no significant structure of type $ZrTiO_4$.

3. A material as in claim 2 wherein x is 1 and y is greater than 0 and less than 3.9.

4. A composition of material of the formula $MN_xO_y$ where M and N are metals selected from the group Sc, Y, Ce, Pr, Nd, Sm, Eu, Gd, Tb, Dy, Ho, Er, Tm, Yb, Lu, Hf, V, Nb, Ta, Ac, Th and U and where O is oxygen and x and y have values such that the oxygen-to-metal ratio is less than 4 and the ratio of y/(1+x) is also less than 4, said material being in the form of a single oxide phase and having a crystal structure of a single type alone without significant crystal structure of a second type, said material being sub-stoichiometric.

5. A composition of material of the formula $MN_xO_y$ where M and N are metals selected from the group Sc, Y, Ce, Pr, Nd, Sm, Eu, Gd, Tb, Dy, Ho, Er, Tm, Yb, Lu, Zr, Hf, V, Nb, Ta, Ac, Th and U and whre O is oxygen and x and y have values such that the the oxygen-to-metal is less than 4 and the ratio of y/(1+x) is also less than 4, said material being in the form of a single oxide phase and having a crystal structure of a single type alone without significant crystal structure of a second type, said material being sub-stoichiometric.

6. A composition of material of the formula $MN_xO_y$ where M and N are metals selected from the group Sc, Y, La, Ce, Pr, Nd, Sm, Eu, Gd, Tb, Dy, Ho, Er, Tm, Yb, Lu, Zr, Hf, V, Nb, Ta, Ac, Th and U and whre O is oxygen and x and y have values such that the oxygen-to-metal is less than 4 and the ratio of y/(1+x) is also less than 4, said material being in the form of a single oxide phase and having a crystal structure of a single type alone without significant crystal structure of a second type, said material being sub-stoichiometric.

7. A material as in claim 6 wherein M is La and N is Zr.

8. A material as in claim 6 wherein M is La and N is Hf.

9. A composition of material of the formula $LM_xN_zO_y$ where L, M and N are metals selected from the group Sc, Y, La, Ce, Pr, Nd, Sm, Eu, Gd, Tb, Dy, Ho, Er, Tm, Yb, Lu, Ti, Zr, Hf, Nb, Ta, Ac, Th and U and where O is oxygen and x, z and y have values such that the oxygen-to-metal ratio is less than 4 and the ratio of y/(1+x+z) is also less than 4, said material having a crystal structure of a single oxide phase alone without significant crystal structure of a second type, said material being sub-stoichiometric.

10. A material as in claims 1, 4, 5, 6 or 9 which is suitable for use in the manufacture of optical thin film coatings.

11. A method for producing an optical coating on a surface of a substrate comprising taking powders from at least two metals/metal oxides and mixing the same to provide a homogenous mixture, pressing the homogenous mixture of powders into tablets, melting the tablets, forming the melted tablets into ingots, crushing the ingots into granules and evaporating the granules in the presence of oxygen to yield a stoichiometric material in the form of an optical coating on the substrate.

12. A method as in claim 11 wherein the step of taking powders consists of taking powders from three metals/metal oxides.

13. A method as in claim 11 wherein the evaporating step is performed by electron beam evaporation.

14. A method as in claim 11 wherein the evaporating step is performed by thermal evaporation.

15. A method as in claim 11 wherein the metals/metal oxides for the powders are selected from the group consisting of the elements, Sc, Y, Ce, Pr, Nd, Sm, Eu, Gd, Tb, Dy, Ho, Er, Tm, Yb, Lu, Ti, Zr, Hf, V, Nb, Ta, Ac, Th and U and their respective oxides.

* * * * *

UNITED STATES PATENT AND TRADEMARK OFFICE
CERTIFICATE OF CORRECTION

PATENT NO. : 5,989,626
DATED : Nov. 23, 1999
INVENTOR(S) : Paul G. Coombs; Russell E. DeLong; Charlotte R. LeGallee It is certified that error appears in the above-identified patent and that said Letters Patent are hereby corrected as shown below:

Title page item [56],
    Foreign Patent Documents, line 2, change "009524" to --0095204--

Col. 4, line 7, after "U and" change "whre" to --where--

Col. 4, line 8, after "that" delete the second occurrence of "the"

Col. 4, line 8, after "oxygen-to-metal" insert --ratio--

Col. 4, line 17, after "U and" change "whre" to --where--

Col. 4, line 18, after "that" delete the second occurrence of "the"

Col. 4, line 18, after "oxygen-to-metal" insert --ratio--

Signed and Sealed this

Thirtieth Day of January, 2001

Attest:

Q. TODD DICKINSON

*Attesting Officer*     *Director of Patents and Trademarks*